Patented Aug. 16, 1938

2,127,364

UNITED STATES PATENT OFFICE 2,127,364

INSTRUMENT FOR TESTING OR UTILIZING VERY HIGH VOLTAGES

Georg Keinath, Berlin-Charlottenburg, and Ludwig Merz, Berlin-Haselhorst, Germany, assignors to Siemens & Halske, Aktiengesellschaft, Siemensstadt, near Berlin, Germany, a corporation of Germany Application February 23, 1937, Serial No. 127,272
In Germany February 22, 1936

7 Claims. (Cl. 171—119)

(Granted under the provisions of sec. 14, act of March 2, 1927; O. G. 5)

Our invention relates to an instrument for testing or utilizing very high voltages. For the regulation of high voltage supply systems voltage or current transformers have been used up to now which are capable of supplying a high secondary output of about 200 V. A. and more. The purpose of our invention is to render these transformers superfluous and at the same time to increase the available secondary output to a value exceeding that hitherto customary, if this should be required.

In accordance with our invention this problem is solved by taking the energy required on the secondary side from an auxiliary current source, and by using an automatic compensator for adapting this energy in respect of amplitude and phase to the high tension value in question. According to this invention no energy is, therefore, taken from the high tension side, particularly if an amplifier is connected in series with the compensator. It is consequently possible to use any device which may be suitable for high tension tests from a theoretical point of view—even such devices as are unable to supply energy,—and to use transformers for the measurement of current which are not suitable for supplying energy.

Figure 1:
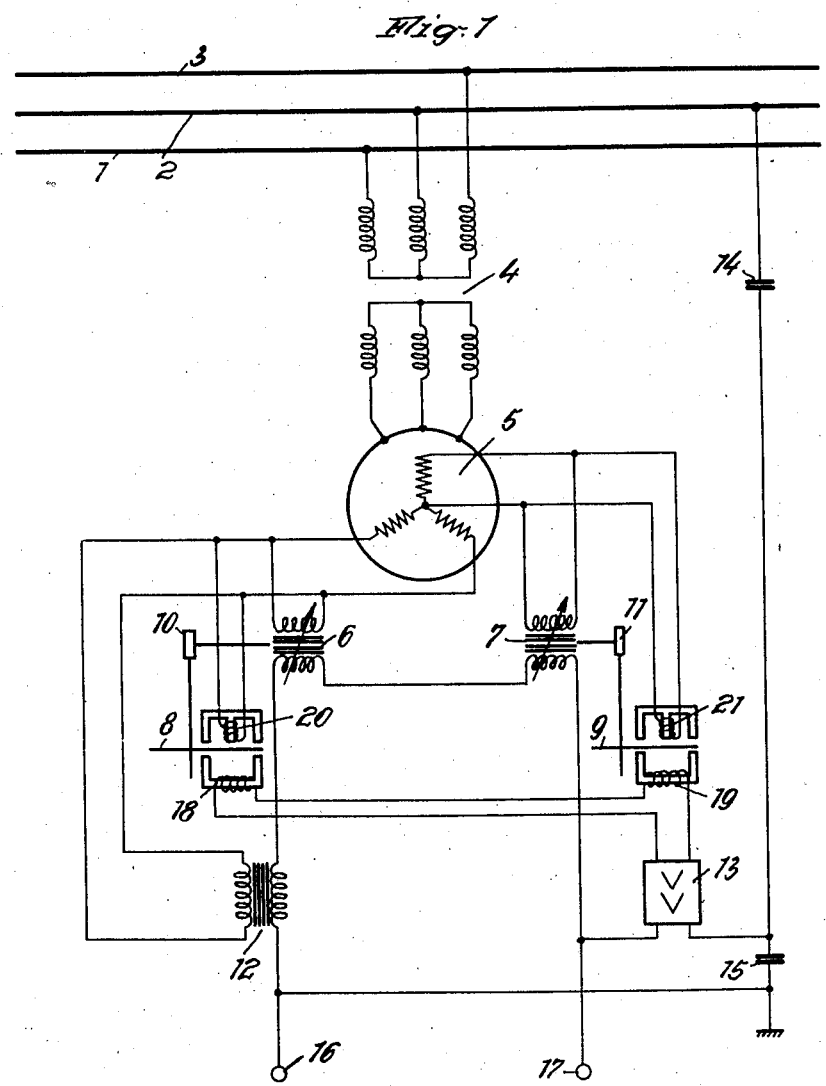
Figure 2:
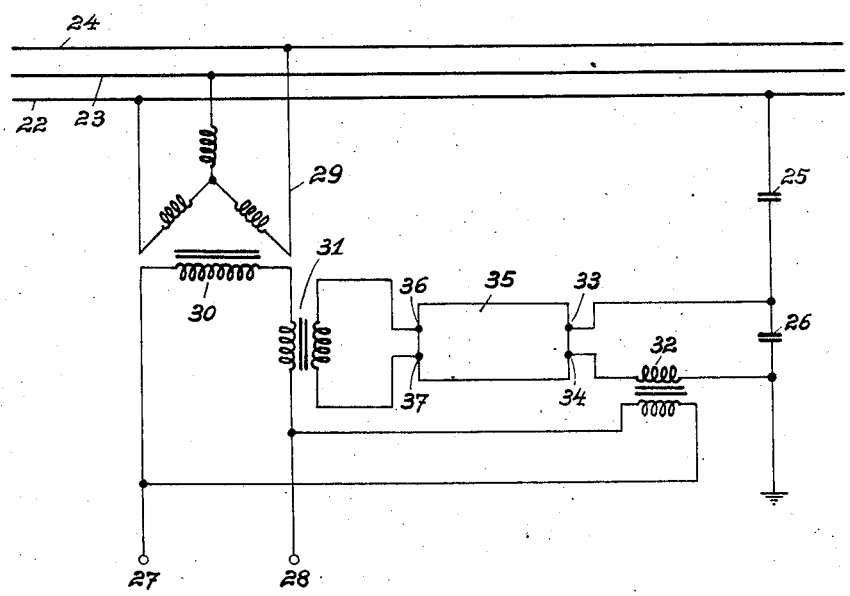

Our invention is described on the basis of two examples represented in the drawings, in which Fig. 1 shows an arrangement with a mechanical compensator, and Fig. 2 an arrangement with an electrical compensator.

Fig. 1 is based on the assumption that it is intended to generate an auxiliary voltage changing proportionally against earth with the voltage of one of the wires (2) of a three-wire supply system, and that this auxiliary voltage is capable of generating a considerable energy, e. g., 200 K. V. A.

The three wires of the three-phase network are marked 1, 2 and 3. 4 is a power transformer connected with the network, and 5 a phase advancer connected with the secondary winding of the transformer 4. Two induction regulators 6 and 7 are connected with the phase advancer. 8 and 9 designate two Ferrari meters. The shafts of the movable members of each Ferrari meter are mechanically coupled by means of a gear 10 and 11 with one of the induction regulators 6, 7 so as to adjust these regulators. 12 designates a potential transformer. The primary winding of the transformer is connected with the phase advancer. The secondary windings of transformer 12 and of the induction regulators 6 and 7 are series connected within a circuit ending at the output terminals 16 and 17 of the device. The wire 2 of the network is grounded through series-connected condensers 14 and 15, of which 14 designates a high voltage capacity and 15 a low voltage capacity. One side of the low voltage condenser 15 is directly connected with the output line of the circuit ending at one of the terminals. The other side of condenser 15 is connected with the other output line, this connection including the primary circuit of an amplifier 13. The secondary circuit of the amplifier includes the current coils 18 and 19 of the Ferrari meters 8 and 9. The voltage coils 20 and 21 of the meters are connected with different phases of the phase advancer 5.

The function of this device is as follows:

The condensers 14 and 15 connected between the high tension line and earth act as voltage dividers. Their capacity is dimensioned so that at the condenser 15 a voltage drop takes place which should preferably correspond to the desired voltage to be tapped at the terminals 16 and 17. Since the three secondary windings of the transformers 6, 7, and 12 are connected in parallel with the condenser 15, and one of the connection lines leads to the input of the amplifier 13, the current coils 18 and 19 of both meters 8 and 9 will become currentless if the voltage at the condenser 15 and the opposed voltage resulting from the transformer windings 6, 7 and 12 correspond to each other with respect to phase and amplitude. In this state of compensation, the voltage at the input of the amplifier equals zero and the equipment is therefore at rest.

The voltage windings 20 and 21 of the two meters are fed from phase advancer 5 with a voltage which is displaced by 90°. In the same manner the primary windings of the induction regulators 6 and 7 are fed by the phase advancer. Phase advancer 5 is adjusted so that whenever the high tension is altered, e. g., with regard to amplitude, meter 9 responds and displaces its induction regulator 7 until the amplitude variation has been compensated again. If the high tension changes in respect of phase, meter 8 will respond, changing its secondary voltage, which is displaced by 90° as compared with the secondary voltage of the transformer, until the state of compensation has been reached again, i. e., until the voltage at terminals 16 and 17 will also coincide in phase with the voltage at condenser 15.

Transformer 12 supplies a fundamental voltage to the output circuit of the device. This transformer is so chosen that this fundamental voltage corresponds to the lowest voltage in phase 2 of the three-phase network against earth, which will still suffice for the purpose to be fulfilled by the device. The induction regulator 7 supplies to the output circuit of the device additional amplitude values, and the induction regulator 6 compensates displacements. The application of transformer 12 thus offers the advantage that not the entire secondary output, but only part of this output has to be regulated.

Just as all variations of the voltage to condenser 15 in respect of amplitude and phase are imposed by the compensator on the voltage to be tapped at the terminals 16 and 17, any changes occurring in the power transformer 4, e. g., by the connection or disconnection of long lines, are fully compensated so that with regard to amplitude and phase the voltage to be tapped at the terminals 16 and 17 will always correspond to the voltage of condenser 15. If instead of a voltage a current is to be reproduced, an analogous procedure is taken. It is advisable to use a ring-type current transformer, which may for instance be placed over one of the insulating bushings of the power transformer 4, and whose larger diameter does not affect the measuring accuracy because only a very small output is tapped on the secondary side. A circuit connection principally intended for voltage measurements will have to be changed to a certain degree when employed for current measurements, because as a rule the range of variation of the current is much greater than the range of variation of the voltage, so that either a considerably smaller absolute value or at least considerably larger components have to be applied, which are easily dealt with by the compensator.

In cases where the phase is of no importance and only the amplitude is to be reproduced or regulated, the compensator may of course be of a correspondingly simpler design.

The invention is neither limited to the use of a compensator of the type shown in Fig. 1 nor to the application of the circuit selected for the example described above. It is therefore also possible to use other types of compensators. In cases where transients are to be dealt with, it is possible to use compensators operating free from inertia.

An example of this kind is shown in Fig. 2.

Between line 22 of a three-phase system 22, 23, 24 and earth, there are again connected as voltage dividers a condenser 25 rated for high tension and, in series therewith, a condenser 26 for low tension. The capacities of the two condensers are preferably so dimensioned that at condenser 26 a voltage drop takes place which corresponds to the desired voltage to be tapped at terminals 27 and 28. For compensation purposes a low tension is taken from a power transformer 29 by means of a secondary winding 30; this tension is of about the same magnitude and phase as the voltage drop at condenser 26. The secondary winding 30 is connected in series with the secondary winding of a potential transformer 31, which is in parallel with the primary winding of a potential transformer 32. The secondary winding of the transformer 32, which is in series with condenser 26, is connected across the input terminals 33 and 34 of an amplifier 35, the output terminals 36 and 37 of which are connected to the primary winding of the transformer 31.

If the low tension taken from the power transformer 29 via winding 30 is equal to the voltage at the condenser 26, a no-load voltage is generated in the transformer 32, which with regard to magnitude is equal to the voltage drop at condenser 26, but opposite in phase. The input of the amplifier is in this case dead. If, however, the two voltages differ from each other with regard to magnitude and phase, a differential voltage is obtained at the input of the amplifier. This differential voltage is amplified and—by means of transformer 31,—superimposed on the low voltage taken from transformer 29, until the differential voltage is almost entirely compensated. If, for instance, the voltage across the condenser 26 differs by 10% from the voltage supplied by transformer 29, and if the amplification factor of the amplifier is =100, then the low tension of the power transformer is compensated to the voltage to be tested within the limit of 0.1%.

As amplifier any known type of electrical amplifier can be used which operates free from oscillations.

In the case of amplifiers of sufficient output it is also possible to dispense with the power transformer 29 and to feed the amplified voltage supplied at the amplifier output to the terminals 27 and 28 and thus also to the primary winding of transformer 32.

The foregoing is the full description of our invention, although the latter is not limited to the examples and circuit diagrams shown herein, but can of course be modified in the form and relative arrangement of the parts without departing from the spirit and scope of the invention.

We claim as our invention:

1. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, an auxiliary current source electrically coupled with said high voltage circuit for producing an auxiliary voltage synchronous with said high voltage, an auxiliary current source for producing an auxiliary voltage synchronous with said high voltage, said source having an input circuit electrically coupled with said high voltage circuit independently of said chain of capacitors, and an output circuit electrically coupled with a part of said chain which consists of at least one of said capacitors, means connected with said output circuit for varying magnitude and phase of said auxiliary voltage in said output circuit in order to balance said auxiliary voltage against the voltage of said capacitor so as to compensate the capacitor voltage, and terminals arranged in said output circuit for taking off the compensating auxiliary voltage.

2. A device for producing low alternating output voltages corresponding in phase and in variations of magnitude to the input voltage of an altenating high voltage circuit, comprising a chain of series-connected capacitors connected with said high voltage circuit so as to divide said high voltage into a potential gradient of definite steps, an auxiliary arrangement electrically coupled with said high voltage circuit for producing two auxiliary voltages synchronous with said high voltage and displaced in phase at 90° against each other, an output circuit connected with both sides of at least one of said capacitors, variable means for coupling said output circuit with said auxiliary arrangement so as to influence said output circuit by said two auxiliary voltages, two watt-metric instruments each having a voltage winding, a current winding and a movable element actuated by said windings, said voltage windings being connected to said auxiliary arrangement so that each of said windings is excited by one of said auxiliary voltages, said current coils being coupled with said output current and said actuated members of each instrument being operatively connected with that of said variable means which is connected to the auxiliary voltage acting at the voltage coil of the same instrument, whereby the voltage of said output circuit is automatically balanced so as to compensate the voltage of said capacitor connected with said output circuit.

3. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, an auxiliary arrangement electrically coupled with said high voltage circuit for producing two auxiliary voltages synchronous with said high voltage and displaced in phase at 90° against each other, an output circuit connected with both sides of at least one of said capacitors, an amplifier having its input side connected between said input circuit and one side of said capacitor, variable means for coupling said output circuit with said auxiliary arrangement so as to influence said output circuit by said two auxiliary voltages, two wattmetric instruments each having a voltage winding, a current winding and a movable element actuated by said windings, said voltage windings being connected to said auxiliary arrangement so that each of said windings is excited by one of said auxiliary voltages, said current coils being coupled with the output side of said amplifier and said actuated members of each instrument being operatively connected with that of said variable means which is connected to the auxiliary voltage acting at the voltage coil of the same instrument, whereby the voltage of said output circuit is automatically balanced so as to compensate the voltage of said capacitor connected with said output circuit.

4. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, an auxiliary arrangement electrically coupled with said high voltage circuit for producing two auxiliary voltages synchronous with said high voltage and displaced in phase at 90° against each other, an output circuit connected with both sides of at least one of said capacitors, two transformers with a variable ratio of transformation, the primary winding of each being connected with said auxiliary arrangement so as to be connected with one of said two auxiliary voltages, the secondary windings of said two transformers being both connected in said output circuit, means for individually varying the ratio of transformation of said two transformers, and wattmetric means coupled with said output circuit and having its movable member operatively connected with said means for varying the ratio of transformation in order to automatically regulate the voltage of said output circuit so as to compensate the voltage of said capacitor connected with said output circuit.

5. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, a transformer having its primary winding connected with said high voltage circuit, a phase advancer connected with the secondary winding of said transformer, having two exit circuits and being designed for producing in said two exit circuits two auxiliary voltages of 90° phase displacement against each other, an output circuit connected with both sides of at least one of said capacitors, two transformers with a variable ratio of transformation, the primary winding of each being connected with one of said exit circuits, the secondary windings of both variable transformers being connected with said output circuit, and two induction meter measuring systems having each a voltage winding, a current winding and a movable member, said voltage windings being each connected to one of said two exit circuits of said phase advancer, said current windings being electrically coupled with said output circuit and said movable members being each operatively connected with one of said variable transformers in order to regulate the ratio of transformation of said variable transformer, whereby the voltage of said output circuit is automatically adjusted so as to compensate the voltage of said capacitor connected with said output circuit.

6. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, an auxiliary arrangement electrically coupled with said high voltage circuit for producing two auxiliary voltages synchronous with said high voltage and displaced in phase at 90° against each other, an output circuit connected with both sides of at least one of said capacitors, two transformers with a variable ratio of transformation, the primary winding of each being connected with said auxiliary arrangement so as to be connected with one of said two auxiliary voltages, the secondary windings of said two transformers being both connected in said output circuit, means for individually varying the ratio of transformation of said two transformers, wattmetric means coupled with said output circuit and having its movable member operatively connected with said means for varying the ratio of transformation in order to automatically regulate the voltage of said output circuit so as to compensate the voltage of said capacitor connected with said output circuit, an additional transformer having its primary winding connected with said auxiliary arrangement so as to be influenced by one of said two auxiliary voltages and having its secondary winding connected in said output circuit in series with the secondary windings of the aforesaid two variable transformers, and means in said output circuit for taking off the voltage generated by said series connection of said three secondary windings.

7. A device for producing low alternating output voltages corresponding in phase and in variations of magnitude to the input voltage of an alternating high voltage circuit, comprising a chain of series-connected capacitors connected with said high voltage circuit so as to divide said high voltage into a potential gradient of definite steps, an auxiliary transformer connected with said high voltage circuit for producing in its secondary circuit an auxiliary voltage, an amplifier having its input circuit connected with at least one of said capacitors, a second transformer having its primary winding connected with the output circuit of said amplifier, the secondary winding of said second transformer being series-connected with the secondary winding of said auxiliary transformer, means in series connection with the aforesaid two secondary windings for taking off a utilizable output voltage, and an additional transformer having its primary winding parallel connected to said means and having its secondary winding connected to the input circuit of said amplifier so as to produce in said input circuit a voltage counteracting and compensating the voltage at said capacitor connected to said circuit.

GEORG KEINATH.
LUDWIG MERZ.